Oct. 13, 1959 R. B. KOSKELA 2,908,185
RELEASE MECHANISM
Filed Jan. 7, 1957 2 Sheets-Sheet 1
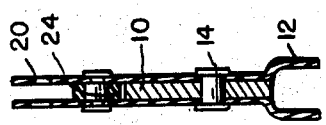
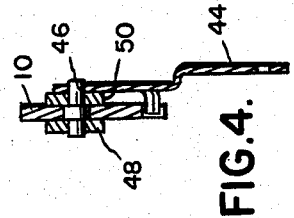
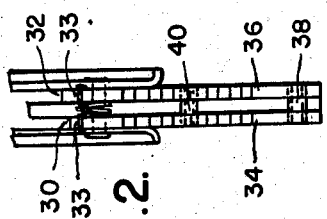
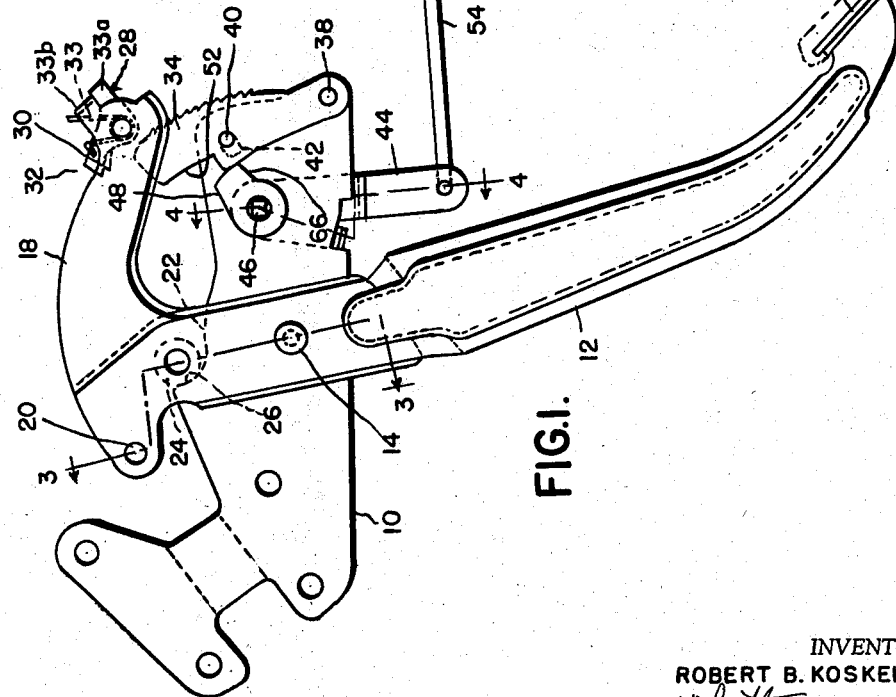
INVENTOR.
ROBERT B. KOSKELA
BY Whittemore,
Hulbert & Belknap
ATTORNEYS

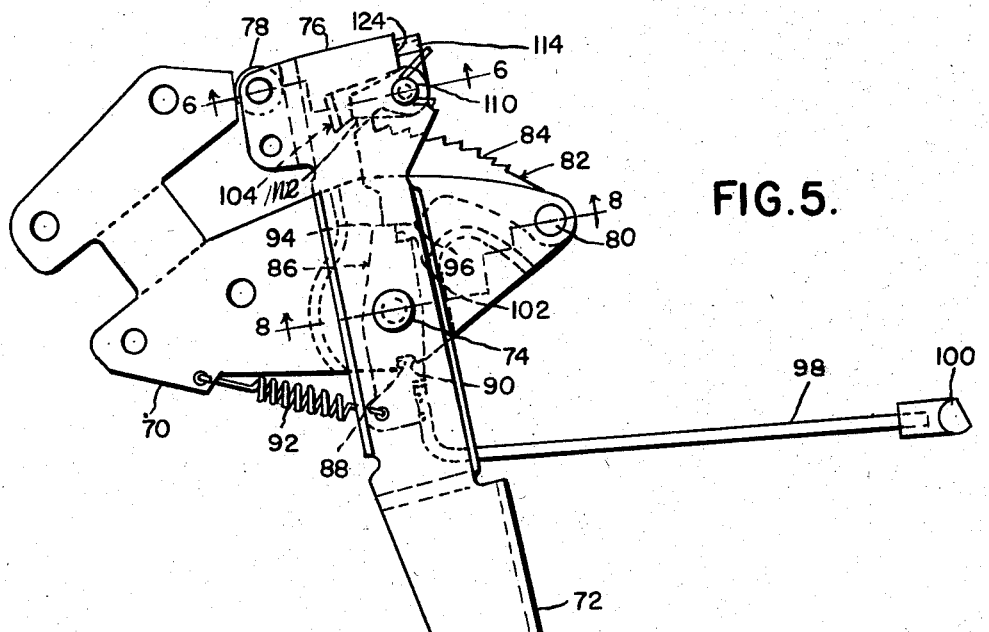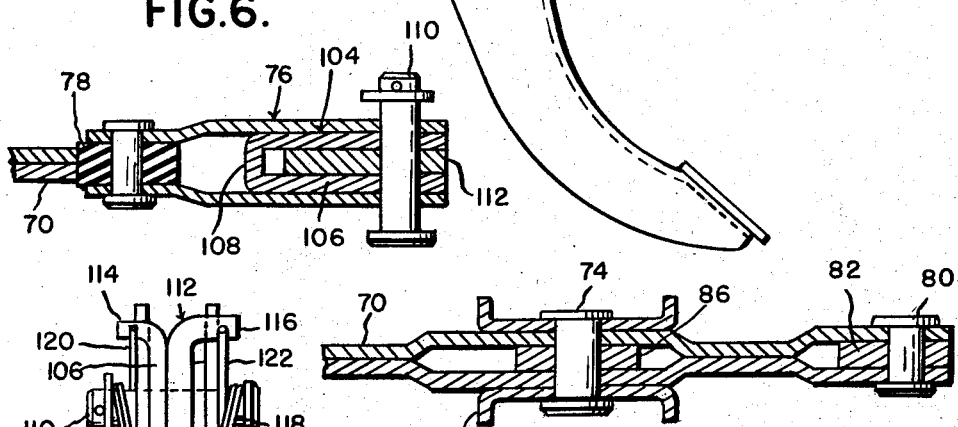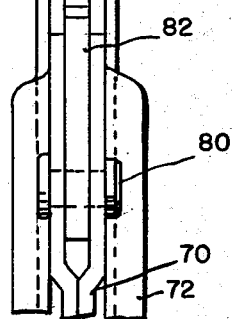

United States Patent Office 2,908,185
Patented Oct. 13, 1959

2,908,185

RELEASE MECHANISM

Robert B. Koskela, Pontiac, Mich., assignor to American Forging and Socket Company, Pontiac, Mich., a corporation of Michigan Application January 7, 1957, Serial No. 632,872

13 Claims. (Cl. 74—535)

The present invention relates to release mechanism and more particularly, to release mechanism designed to release a parking brake with a minimum of effort independent of the force with which the brake has been applied.

It is an object of the present invention to provide pedal control mechanism including latch means for retaining a pedal in an operated position, and manually operable means for releasing the latch means independent of the force with which the pedal was operated.

More specifically, it is an object of the present invention to provide a parking brake including a foot pedal adapted to be connected to the brake system to apply the brakes with considerable force, pawl and ratchet latch means for retaining the pedal in brake applied position, and manually operable means for releasing the pawl and ratchet mechanism by the application of a force independent of the force with which the pedal was applied.

Other objects and features of the invention will become apparent as the description proceeds, especially when taken in conjunction with the accompanying drawings, illustrating preferred embodiments of the invention, wherein:

Figure 1 is a side elevational view of the parking brake mechanism.

Figure 2 is a fragmentary front elevational view of the parking brake mechanism.

Figure 3 is a fragmentary section on the line 3—3, Figure 1.

Figure 4 is a fragmentary section on the line 4—4, Figure 1.

Figure 5 is a side elevation of a second embodiment of the present invention.

Figure 6 is a fragmentary section on the line 6—6, Figure 5.

Figure 7 is a fragmentary front elevation.

Figure 8 is a fragmentary section on the line 8—8, Figure 5.

The parking brake applying mechanism is mounted on a bracket 10 and includes a pedal 12 pivoted as indicated at 14 to the bracket 10. At its lower end the pedal 12 includes a foot engaging portion 16 and above the pivot mounting 14 it is provided with a head 18 having an opening 20 at one end thereof for connection to a cable connecting to the brake system of the vehicle.

The bracket 10 includes an arcuate portion 22 concentric with the pivot mounting 14 and the pedal 12 carries a bumper 24 movable over the arcuate portion 22 of the bracket and engageable at one end thereof with a shoulder 26 to limit movement of the pedal. The principal purpose of the bumper is to absorb the energy when the brake pedal is released by means subsequently to be described.

In order to retain the pedal in brake applied position, the head 18 is provided with a spring pressed pawl device 28 which may conveniently take the form of two spring pressed pawls 30 and 32, as best seen in Figure 2. The pawls are urged into ratchet engaging position by springs 33 and their movement in this direction is limited by engagement between projections 33a on the pawls with an ear 33b on the head 18. The provision of two pawls permits the pedal to be retained in substantially the position of furthest application.

Carried by the bracket 10 at opposite sides thereof are a pair of ratchet arms 34 and 36. These arms are interconnected at one end and pivotally secured to the bracket 10 by a pin 38. The arms are also interconnected by a pin 40 which extends through an elongated opening 42 in the bracket 10 and thus permits limited swinging movement of the ratchet arms 34 and 36. In the position shown in Figure 1 the teeth of the ratchet arms are in position to be engaged by the noses of the pawls 30 and 32.

Mounted on the bracket 10 is a control arm 44 which is pivoted thereto by pivot means 46. The pin 46 has connected thereto a pair of abutment elements 48 and 50 having nose portions engageable with the sides of the ratchet arms 34 and 36 remote from the teeth, as best illustrated in Figure 1. It will be observed that the ratchet arms 34 and 36 are cut away as indicated at 52 so that when abutment elements 48 and 50 are swung a short distance counterclockwise from the position shown in Figure 1, the ratchet arms 34 and 36 are movable away from the pawls.

Connected to the lower end of the operating arm 44 is a rod 54 connecting to a pull button 56 located under the instrument panel 58 by a bracket 60. A spring 62 extends between an abutment 64 on the rod 54 and the bracket 60 and urges the pull button 56 and rod 54 to the left, thus retaining the abutment elements 48 and 50 in the position in which they in turn retain the ratchet arms 34 and 36 in operative position.

The abutment elements 48 and 50 include surfaces 66 engageable with shoulders at the edge of the ratchet arms opposite the teeth effective to restore the ratchet arms to operative position when the pull button 56 is released and when the foot pedal is in brake release position.

The parts in Figure 1 are shown in brake released position. It will be observed that in this figure the spring 62 has returned the pull button 56 to the left and has thereby rotated the abutment members 48 and 50 into the position in which they retain the ratchet arms 34 and 36 in position to be engaged by the pawls 30 and 32. At this time the parking brake may be applied by pressing on the portion 16 of the pedal. The system may be arranged to provide for a very powerful brake application, since release of the brakes is in nowise dependent upon the force with which the brakes have been applied.

Clockwise swinging movement of the pedal 12 results in movement of the pawls 30 and 32 over the teeth of their respective ratchet arms 34 and 36. When the pressure is released from the portion 16 of the pedal, one or the other of the pawls 30 or 32 engages its ratchet and retains the pedal in the furthermost position of brake application. When it is desired to release the brake the operator merely pulls on the pull button 56 swinging the control arm 44 in a counterclockwise direction and moving the abutment elements 48 and 50 out of blocking relation to the ratchet arms 34 and 36. The angle on the teeth of the ratchets is selected such that when the ratchet arms are released, the pressures developed by the noses of the pawls force the ratchet arms away from the pawls and thus release the pedal for movement to the brake off position. Inasmuch as the pedal may at this time move to released position with considerable force, the bumper 24 takes up against the shoulder 26 to silence the operation.

Referring now to Figures 5–8 there is illustrated a second embodiment of the present invention. In these Figures the structure comprises a bracket 70 adapted to be fixedly mounted in a motor vehicle. The parking brake system includes a foot pedal 72 connected to the bracket for rocking movement about a pivot pin 74. At its upper end the pedal 72 includes a head 76 carrying a bumper 78 at its forward end adapted to engage against a portion of the bracket 70 to cushion the foot pedal when it is released.

Pivoted to the bracket 70 by a pivot pin 80 is a ratchet sector 82 having teeth 84 thereon. Mounted for limited rocking movement about the pivot pin 74 is a sector blocking element 86. The element 86 carries a pin 88 movable in an arcuate recess 90 to limit rocking movement of the blocking element. A tension spring 92 interconnects the bracket 70 and the blocking element 86 and urges the element into blocking position. The blocking element 86 includes a nose 94 engageable beneath a portion 96 of the ratchet sector and in the position illustrated in Figure 5 it will be observed that the nose 94 underlies the portion 96 and hence retains the sector 82 in operating position.

The blocking element 86 has rigidly secured thereto an operating arm 98 having a handle 100. When the handle is lifted, the blocking element is rocked counterclockwise from the position shown to a position in which a notch 102 moves into position beneath the portion 96 of the ratchet sector and permits the sector to swing counterclockwise about pivot pin 80. When the handle 100 is released the spring 92 rotates the blocking element 86 clockwise and cams the ratchet sector 82 back into the operating position illustrated.

Pawl mechanism is carried by the head 76 of the pedal 72. The pawl mechanism comprises a U-shaped pawl element 104 having parallel legs 106 connected by a cross piece 108 shaped to include a pawl portion engageable with the ratchet teeth 84. The U-shaped pawl element is pivoted to the head 76 by a pivot pin 110. Received between the legs 106 of the U-shaped pawl element is a second flat pawl element 112 mounted on the pin 110 for movement independently of the pawl element 104. One leg 106 of the U-shaped pawl element is turned outwardly as indicated at 114 and the other pawl element 112 has its upper portion turned out as indicated at 116 in Figure 7. Surrounding the pin 110 is a coil spring 118 having end portions 120 and 122 engageable with the outwardly turned pawl portions 114 and 116 respectively.

The surfaces of the ratchet teeth 84 which are engaged by the noses of the pawls 104 and 112 are disposed such that when the blocking element 86 is moved to unblocking position, the pawl which at that time is engaged with a ratchet tooth establishes forces urging the ratchet sector away from the pawl, thus releasing the pedal. The amount of rotation which is permitted the pawls is determined by engagement between the outwardly turned portions 114 and 116 of the pawls and abutment surfaces 124 provided on the head portion 76 of the pedal 72.

The operation of the mechanism is substantially the same as that of the embodiment previously described. Relatively great forces may be applied through the foot pedal establishing correspondingly great forces tending to move the foot pedal counterclockwise as seen in Figure 5, or to brake release position. Such movement of the pedal is prevented by engagement between the pawl and ratchet mechanism. However, in order to release the pedal, relatively small forces are required since the engaging surfaces of the nose piece 94 of the blocking element and the portion 96 of the ratchet sector may be concentric with the axis of the pivot pin 74. This overcomes difficulties which have previously been encountered in systems which required the application of as much or more force to effect release of the brake as was expended in applying the brake.

The drawings and the foregoing specification constitute a description of the improved release mechanism in such full, clear, concise and exact terms as to enable any person skilled in the art to practice the invention, the scope of which is indicated by the appended claims.

What I claim as my invention is:

1. Brake control mechanism comprising a foot pedal for a parking brake, a fixed bracket to which said pedal is pivoted, a pawl pivoted to said pedal, a ratchet arm pivoted to said bracket for movement toward and away from the path of travel of said pawl into and out of cooperative relation with said pawl, an abutment member movably mounted on said bracket for movement between a first position in which said abutment member engages said ratchet arm and retains said ratchet arm in operative position and a second position in which said abutment member releases said arm for movement away from said pawl, a pull button means, connecting said button to said abutment member, resilient means urging said member in a direction to retain said member in position to render said ratchet arm operative.

2. Brake control mechanism comprising a foot pedal for a parking brake, a fixed bracket to which said pedal is pivoted, a pawl pivoted to said pedal, a ratchet arm pivoted to said bracket for movement toward and away from the path of travel of said pawl into and out of cooperative relation with said pawl, an abutment member pivotally mounted on said bracket for movement between a first position in which said abutment member engages said ratchet arm and retains said ratchet arm in operative position and a second position in which said abutment member releases said arm for movement away from said pawl, an operator actuated lever arm fixed to said abutment member, and resilient means operatively connected to said abutment member to urge said abutment member in a direction to retain said abutment member in position to render said ratchet member operative.

3. Mechanism as defined in claim 2 which comprises common pivot means on said bracket mounting said pedal and abutment member for independent angular movement about the axis of said pivot means.

4. Brake control mechanism comprising a foot pedal member for a parking brake, a fixed bracket member to which said pedal member is pivoted, a pawl pivoted to said pedal member and movable therewith in an arcuate path, a ratchet arm pivoted to said bracket member for movement toward and away from said pawl, said ratchet arm having pawl engageable teeth disposed in an arcuate path, abutment means pivotally connected to one of said members for movement between an operative position in which said abutment means rigidly supports said ratchet arm in operative pawl engaging position and a release position in which said abutment means releases said ratchet arm for movement away from said pawl, an operator actuatable brake release means connected to said abutment means to move said abutment means to release position when the pedal member is latched in brake-applied position, resilient means operatively connected to said abutment means to urge said abutment means into operative position, and operative to restore said abutment means and ratchet arm to operative position when said operator actuatable brake release means is released in brake-off position.

5. Brake control means comprising a fixed support, a brake lever pivoted to said support, a pawl pivoted to said lever for movement therewith in an arcuate path, a ratchet arm carried by said support and having pawl engageable teeth disposed in arcuate arrangement adjacent the path of movement of said pawl, means mounting said ratchet arm for movement toward and away from said path, movable abutment means carried by said support selectively operable by movement thereof to support said ratchet arm rigidly in position to be engaged by said pawl or to provide for movement of said ratchet arm away from said path to a position in which said pawl is released from the ratchet teeth, said movable means including an operator actuatable member to effect release of said pawl, said pawl and the teeth of said ratchet arm being shaped with reference to the pivot mountings thereof to produce forces effective to swing the ratchet arm to pawl clearance position upon movement of said abutment means to release position.

6. Brake control means as defined in claim 5 in which the means mounting said ratchet arm on said support comprises pivot means connected to said arm at one end, the other end of said arm being swingable.

7. Brake control means as defined in claim 6 which comprises resilient means connected to said movable means operable to restore said ratchet arm to pawl engaging position when said operator actuatable member is released.

8. Brake control means as defined in claim 7 in which said lever is a foot operated pedal.

9. Brake control means as defined in claim 8 in which said operator actuatable member is a manually operable lever.

10. Brake control means comprising a fixed bracket member, a brake lever member pivoted to said fixed bracket member, a pawl pivoted to said lever member for movement therewith in an arcuate path, a ratchet arm carried by said bracket member and having pawl engageable teeth disposed in arcuate arrangement adjacent the path of movement of said pawl, means mounting said ratchet arm for movement toward and away from said path, movable abutment means carried by one of said members and movable relative thereto between an operative position in which said abutment means supports said ratchet arm rigidly in position to be engaged by said pawl and a release position in which said ratchet arm is moved to a position in which said pawl is released from the teeth of said ratchet arm, an operator actuatable member operatively connected to said abutment means to move said abutment means to release position, resilient means operatively connected to said abutment means and operable to restore said abutment means and ratchet arm to operative position when said operator actuatable member is released with said brake lever member in brake-off position, said pawl and the teeth of said ratchet arm being shaped with reference to the pivot mounting thereof to produce forces, when the brakes are applied, effective to move the ratchet arm to pawl clearance position upon movement of said abutment means to release position.

11. Brake control means as defined in claim 10 in which said abutment means includes a pivot mounting concentric with the pivot axis of said brake lever member.

12. Brake control means as defined in claim 10 in which said abutment means includes a pivot mounting remote from the pivot axis of said brake lever member.

13. Brake control mechanism comprising a fixed bracket member, a foot pedal member for a parking brake pivoted to said bracket member for movement between brake applying position and brake released position, pawl and ratchet mechanism connected between said bracket member and foot pedal member and engageable when said foot pedal member is in position to apply brakes to retain said foot pedal member in brake applying position, said pawl and ratchet mechanism comprising a ratchet pivotally mounted on one of said members and a pawl pivotally mounted on the other of said members for movement toward and away from said ratchet, means limiting movement of said pawl toward said ratchet, said ratchet being movable between an operating position in which said pawl cooperates therewith to retain said pedal member in brake applying position and a release position in which said ratchet is free of said pawl and said pedal member is movable to brake released position, blocking means mounted on one of said members for movement between a ratchet blocking position in which said blocking means prevents movement of said ratchet to release position and a ratchet release position, and operator actuable means connected to said blocking means effective to move said blocking means from blocking position to ratchet release position.

References Cited in the file of this patent

UNITED STATES PATENTS

| | | |
|---|---|---|
| 738,100 | Cuntz | Sept. 1, 1903 |
| 2,132,954 | Jandus | Oct. 11, 1938 |
| 2,147,580 | McCarthy | Feb. 14, 1939 |
| 2,308,898 | Skareen | Jan. 19, 1943 |
| 2,405,956 | Jandus | Aug. 20, 1946 |
| 2,467,557 | Jandus | Apr. 19, 1949 |
| 2,694,945 | Jandus | Nov. 23, 1954 |
| 2,722,136 | Krause | Nov. 1, 1955 |
| 2,835,140 | Cox | May 20, 1958 |
| 2,851,900 | Powell | Sept. 16, 1958 |